United States Patent

[11] 3,585,612

[72] Inventors Andre Corbaz
Veyrier/Geneva;
Jean-Pierre Engel, Geneva; Erwin Zurcher, Aire/Geneva, all of, Switzerland
[21] Appl. No. 825,510
[22] Filed May 19, 1969
[45] Patented June 15, 1971
[73] Assignee Edouard Dubied & Cie. S.A.
[32] Priority May 21, 1968
[33] Switzerland
[31] 7641/68

[54] REPETITIVE PLAYBACK MEANS COMPRISING AN INTERMITTENTLY DRIVEN TAPE
8 Claims, 10 Drawing Figs.

[52] U.S. Cl. 340/173LM, 250/219D, 235/61.11
[51] Int. Cl. G11c 13/04
[50] Field of Search 250/219 Ft, 219I, 219Q, 219CR, 227 209; 235/115, 61.11; W; 356/71; 340/173 LM, 174.1 A; 179/100.2 S

[56] References Cited

UNITED STATES PATENTS

| | | | |
|---|---|---|---|
| 2,616,983 | 11/1952 | Zworykin et al. | 250/219 X |
| 3,124,675 | 3/1964 | Epstein | 235/61.11 |
| 3,290,987 | 12/1966 | James et al. | 356/71 |
| 3,444,358 | 5/1969 | Malone | 250/219 X |
| 2,952,416 | 9/1960 | Sampson | 250/219 X |

*Primary Examiner*—Walter Stolwein
*Attorney*—Waters, Roditi, Schwartz & Nissen

ABSTRACT: Repetitive playback means for controlling the operation of a machine, comprising a tape adapted to be driven intermittently to and fro past reading means and having items of information recorded thereon along parallel longitudinally extending tracks, sad items forming two categories, one being read as the tape travels in one direction and the other being read as the tape travels in the other direction, the tape also having recorded thereon near its ends instructions for causing the tape drive to be reversed as the tape reached either end.

REPETITIVE PLAYBACK MEANS COMPRISING AN INTERMITTENTLY DRIVEN TAPE

This invention relates to devices for repetitively playing back recorded information.

An object of the invention is to provide a solution to the problems involved in the repetitive playback of a large amount of information previously recorded on a suitable medium.

The repetitive playback of a small amount of information in a simple manner can quite easily be achieved by using a medium consisting of a short, continuously moving, loop. By way of example, reference may be made to certain echo loops used in sound-recording technology, or to the loops used in the automatic repetition over the telephone of information intended for the public. With some machines, programming involves only a small number of items of information so that their program can be provided on a looped recording medium. The short length of such loops does not give rise to any storage problems.

It is however quite a different matter when it is desired to play back in a repetitive manner a large number of items of information requiring a recording medium of substantial length (tape). This is for instance the case with long-playing sound recordings which it is desired to play back over and over again without any interruption or with lengthy control programs for knitting machines, looms or numerically controlled machines whose program is to be repeated automatically at regular time intervals.

Several solutions have been proposed for storing such long-lasting recording media adapted continuously to move past a reading unit.

One of these solutions consists in joining the two ends of the tape to form a loop of considerable length. The tape, as it travels past the reading unit, is stored in zigzag fashion in a suitable magazine which, by virtue of its shape, prevents successive folds of the tape from overlapping one another and enables continuous extraction of the tape. One drawback of this arrangement lies however in the fact that a succession of quite sharp bends comes to be formed in the stored tape. Whereas these bends are in no way bothersome when magnetic tape is involved, they can be damaging when the recording medium used is photographic film as the latter tends to become marked by bends that are too sharp.

Another solution consists in winding the tape spirally with its two ends (outer and inner) joined together. Although endless tape of considerable length can be stored in this way, there is the danger, with, for instance, a hygroscopic recording medium (e.g. triacetate), that one turn may accidentally come to stick to the next. Moreover, it would be difficult to apply this solution to punched tapes as successive turns are liable to hook on to one another.

There has also been proposed a device for storing information, with a view to deferred repetitive playback, wherein a tape providing the recording medium for this information is wound into a helicoid having a plurality of turns, the beginning of the first turn being connected to the end of the last turn so as to form an endless tape, there being provided a drive mechanism for driving each turn at least indirectly, by causing it to rotate about its own center at a speed which is identical for all turns as they come to be read.

The manufacture of such helicoidal tape is, however, quite tricky. A device using such a tape is described in Swiss Pat. specification No. 388,381.

Finally, reference may be made, for the sake of completeness, to some ancient repetitively operating devices which used plates and which were employed in Jaccard looms or in barrel organs. However, because of their slowness and their bulk, they are wholly unsuited for the programmed control of modern machines.

The present invention seeks to overcome the drawbacks of the above-mentioned solutions and this it does in a fundamentally novel way. According to the invention there is provided a device for repetitively playing back items of information, as for the programmed control of a machine, comprising a tape acting as a recording medium for said items of information, means for driving said tape, means for winding and storing said tape, and means for reading said items of information, wherein the means for driving the tape include means for engaging the tape and actuating means for moving the tape through the intermediary of said engaging means, intermittently and reversibly past the reading means, wherein the items of information are recorded on the tape along parallel tracks extending lengthwise of the tape, said items of information forming two categories with the items belonging to one category being read by the reading means when the tape travels in one direction and the items belonging to the other category being read by the reading means when the tape travels in the opposite direction, and wherein at least one of said tracks carries at each of its ends at least one item of information for causing at least the reversal of the direction of motion of the tape, the arrangement being such as to enable repetitive playback of the items of information carried by the tape by moving the portion of the tape carrying the items of information alternately past the reading means first in one direction and then in the other.

For a better understanding of the invention and to show how it may be carried into effect, the same will now be described by way of example with reference to the accompanying drawings, wherein.

The invention will be described, by way of example, as applied to the control of a knitting machine having a plurality of knitting stations.

Figure 1:
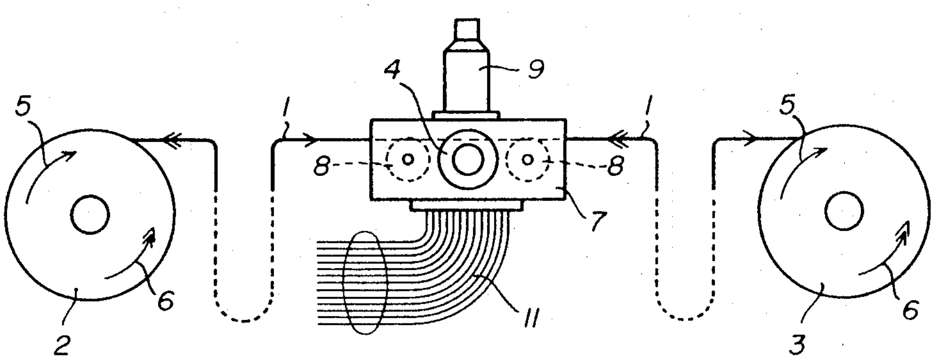
FIG. 1 is a diagram sharing the principle of a device in accordance with the invention.
Figure 7:
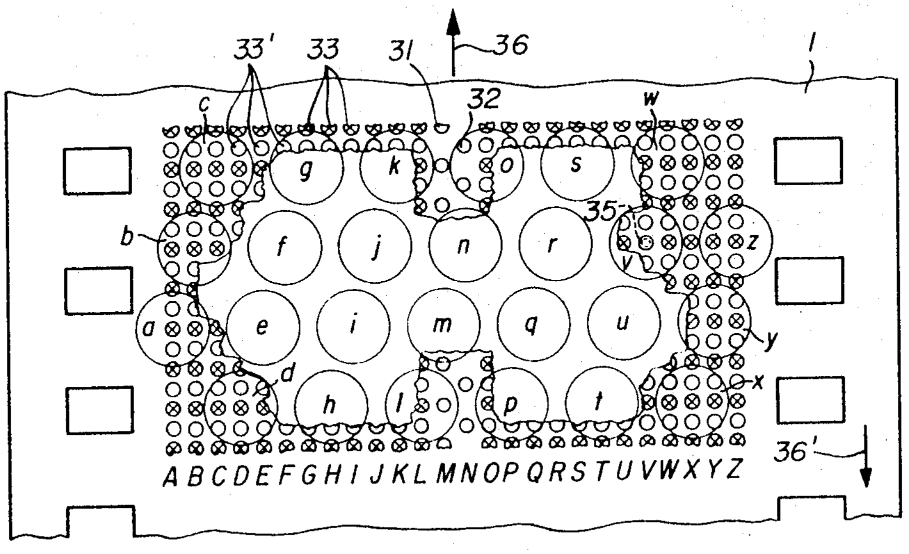
FIGS. 7 and 8 illustrate two possible ways of arranging items of information on a recording medium used with a device according to the invention.

Referring first to FIG. 1, the tape consists of a standard 35 mm. photographic film 1. The tape could of course also consist of punched, magnetic or other tape, provided a suitable reading system is provided. Film 1, which is more particularly shown in FIG. 7, is wound on and off two takeoff cum takeup spools 2 and 3 which can rotate indifferently in the directions of arrows 5 and 6. The film passes through a driving and reading unit 7 and is engaged by rotary members 8.

The spools 2 and 3 are associated with winding and unwinding means which have not been shown here. These means enable, inter alia, the direction of movement of film 1 to be instantaneously reversed at high speed by temporizing the corresponding reversal in the direction of rotation of spools 2 and 3 as the latter, because of their substantial inertia, are not conducive to instantaneous reversal of rotation.

Figure 6:
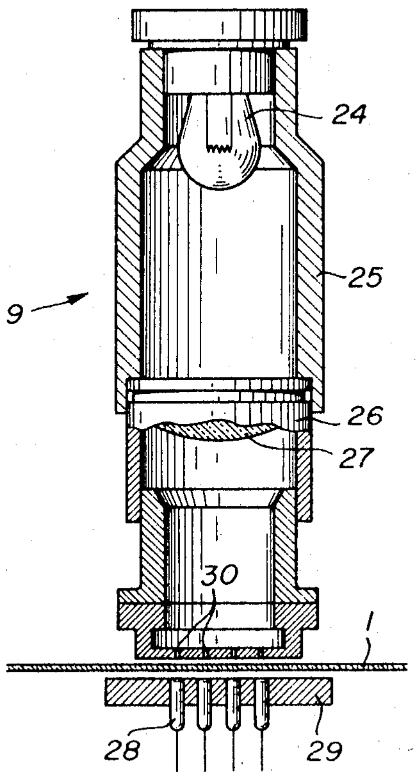
FIG. 6 shows, on a somewhat enlarged scale, mostly in axial section, a light source for such reading which forms a part of the unit shown in FIG. 2.

The reading means, which can more readily be considered in relation to FIG. 6, include a light source 9 and a network 29 of photoelectric cells 28 adapted to feed pulses to leads 11 for the operational control of the various stations of the knitting machine.

Figure 2:
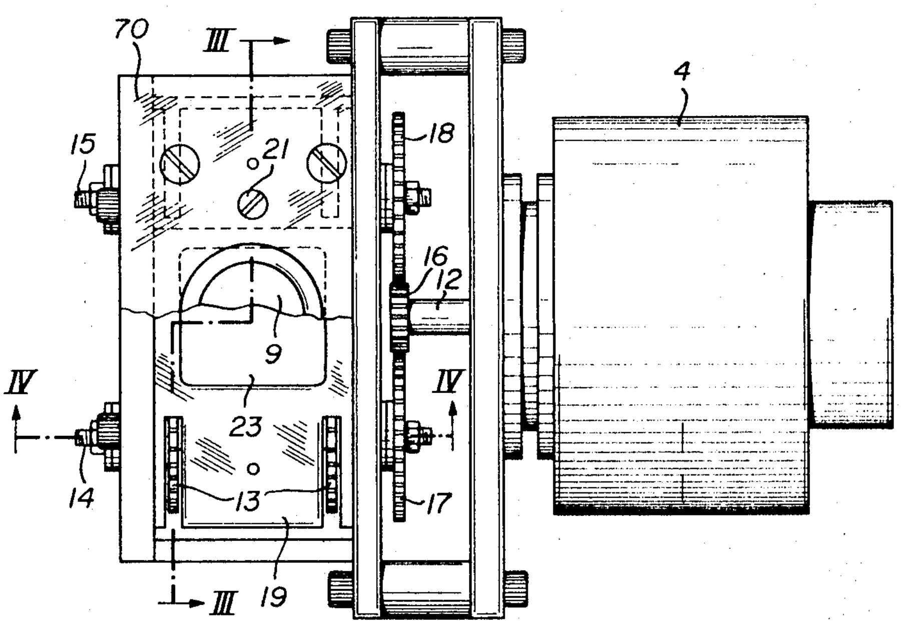
FIG. 2 is a plan view, with certain parts broken away, of a tape driving and tape reading unit suitable for use in a device according to the invention.
Figure 3:
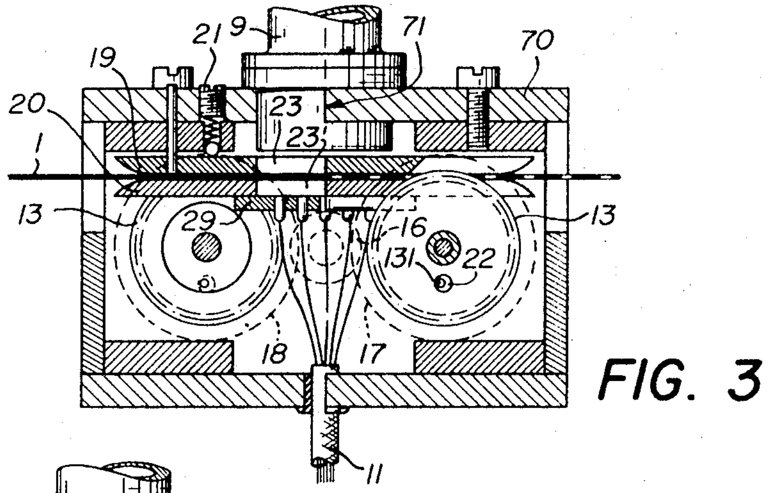
FIGS. 3 and 4 are, essentially, sections taken along lines III–III and IV–IV of FIG. 2.
Figure 4:
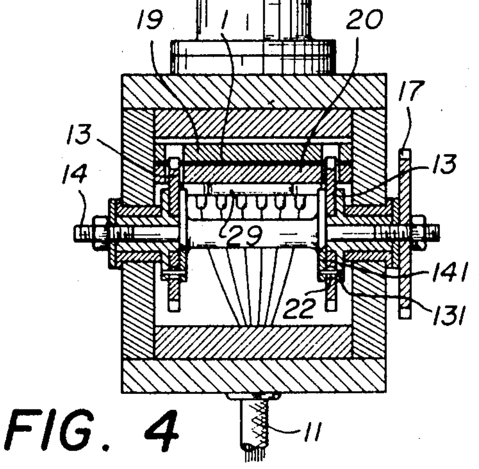
Figure 5:
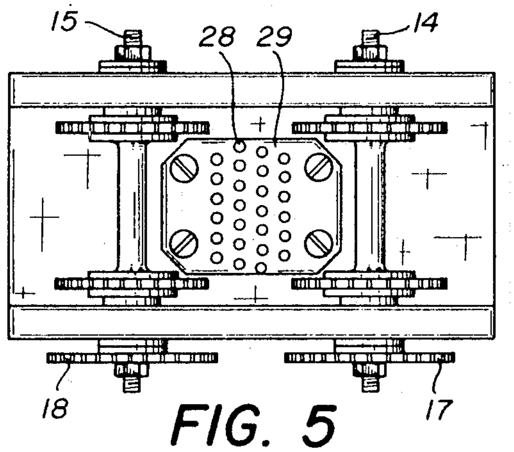
FIG. 5 is an underneath plan of the unit shown in FIG. 2 with certain parts removed to show an arrangement of reading cells used therein.

Referring now to FIGS. 2, 3 and 4, the film driving means include a motor 4, which can be of the permanent magnet type or of the variable reluctance type, and the film-engaging members 8 which here consist of four sprockets 13 arranged in coaxial pairs mounted on two shafts 14 and 15.

The function of the motor 4 is to enable the film to be intermittently and reversibly driven through the intermediary of these engaging members. It may be a stepping motor or a motor adapted to operate step by step, or it may be replaced by a plurality of stepping motors, by a clutch and brake motor or by a mechanical, continuous drive, mechanism provided with a clutch and a reversing system adapted to come into operation when a change in the direction of movement of the film is triggered off.

The spacing between the sprockets 13 of each pair is equal to that between the film-driving perforations with which their teeth are intended to come into engagement. The motor 4 drives these wheels via a pinion 16 carried by the motor shaft 12 and via two cogged wheels 17 and 18 respectively secured to shafts 14 and 15.

In the illustrated construction, sprockets 13 are secured to their respective shafts 14 or 15, for movement therewith in either direction, by a pin 131 which extends through both a flange 141, formed on shafts 14 and 15 respectively, and a hole 22 formed in each sprocket. By giving pin 131 a suitable diameter, less than that of hole 22, it thus becomes possible to provide a certain amount of angular play between the sprockets and the drive shaft 12 so as to bring about in the drive of the film a lag corresponding to half a motor step each time the direction of movement of the film is reversed.

This half-step lag that occurs in the movement of the program-carrying film each time its direction of movement is reversed can also be achieved, again mechanically, with the help of a differential device by means of which one half-step can be added or subtracted as and when required.

These mechanical solutions, given by way of example, can be replaced by electrical solutions. One such electrical solution consists in causing, in one direction of travel of the film, the step-by-step operating motor to rotate by sequentially energizing, one at a time, each of the successive windings of the stator (rotating field), and then in causing, in the opposite direction of travel of the film, the motor to rotate the other way round by sequentially energizing, but in the opposite order, each of the stator windings, two at a time. In this way, when reversing the direction of movement of the motor, all of the successive stopping positions of the motor can be shifted by one half-step since the resulting film, through being simultaneously produced by two successive windings at a time, is oriented, at each step of the motor, along a line which bisects the angle formed by the axes of these two windings and not along one such axis as is the case in the initial direction of rotation of the motor. A further half-step shift takes place in the same manner upon returning to this other rotational direction.

Another electrical solution consists in causing the film to move only once in every two steps of the motor, except during reversal of the direction of movement of the film when the latter is successively driven in one direction and then in the other, respectively, at each of a pair of consecutive steps of the motor. The stopping (or only slowing down) positions of the film are thus shifted by half a step at each reversal of its direction of motion.

Film 1 is nipped between two plates 19 and 20 and the pressure exerted by these plates can be adjusted by means of a screw 21, thereby applying to the motor a braking torque, of the order of 0 to 200 g.cm., which helps to dampen the oscillations of the film. Such a damping action can also be achieved by progressively increasing the angular speed of the motor, if the latter is of the polyphase type. During the initial portion of a motor step, two windings are kept energized at the same time by two consecutive phases, whereupon only the second of these two windings is kept energized to complete the step; this means having for each step of the motor two progressive positions of the rotating field, which follow one another in the direction of rotation of the motor.

Plates 19 and 20 are formed respectively with apertures 23 and 23′ (FIG. 3) and block 7 is closed off at the top by a cover 70 formed with an opening 71 into which extends the base of the light source 9 mounted on cover 70. Aperture 23 and opening 71 enable the light rays from the source to reach the film 1 and aperture 23′ enables the light rays having crossed the film to reach cells 28.

Source 9 comprises a lamp 24 mounted in a socket 25 carried by a support 26 for an optical condenser 27. The light travelling through the condenser passes through the film 1 and impinges on photoelectric cells 28 arranged as a grid in a supporting plate 29. The arrangement shown in FIG. 6 constitutes the means for reading the information carried by film 1. It will be appreciated that these reading means could equally well be arranged independently of unit 7.

Suitable means, here consisting of a plate formed with holes 30, are provided to feed to each cell 28 the light intended therefor.

Such reading means are described in our copending Pat. application No. 825,513 (corresponding to Swiss Pat. application No. 7640/68.)

FIG. 7 shows a portion of the film 1 on which is to be recorded the information required to program a knitting machine having 24 knitting stations.

The information is recorded on the film along tracks extending lengthwise of the film with each track being made up of alternate items of information forming two series adapted each to be read individually by the reading means, the first when the film travels in one direction and the other when the film travels in the opposite direction.

Circles 33, marked with a cross, indicate locations at which can be recorded items of information meant to be read when the film 1 travels past the reading means in the direction given by arrow 36, whereas the unmarked circles 33′ indicate locations at which can be recorded items of information intended to be read when the film travels past the reading means in the opposite direction, i.e. the direction given by arrow 36′. The items of information recorded on film 1, e.g. in the form of transparent circles or circular punched holes, are arranged to form 24 parallel tracks extending lengthwise of film 1, i.e. one track per knitting station. The minimum distance between two adjacent locations 33 or 33′ along one track, i.e. between two items of information intended to be read in one direction of movement of the film, corresponds to the distance travelled by the latter as the motor 4 moves one step. In FIG. 7, film 1 has in fact 26 tracks A to Z of which 24 are made up of locations 33 and 33′ for the items of information and two, M and N, consist of items of synchronization data 31 and 32 respectively, whose function will be given further on.

Circles *a* to *z* in FIG. 7 are projections onto film 1 of the sensitive surfaces of 26 photoelectric cells 28 for reading the 26 tracks A to Z. These 26 cells are so arranged that each may receive, through one of the holes 30 and through the items of information it is required to read, the light from source 9 at the center of its sensitive surface. The diameter of these holes 30, the distance between the latter and the film and the distance between the film and the cells are so chosen that at each location 33 or 33′ only a zone 35 of slightly lesser diameter will be illuminated.

As the film travels past the reading means the cells in fact read all of the items of information recorded at locations 33 and 33′ of tracks A to Z, i.e. not only the items of information which are meant to be read in the direction in which the film is travelling but also the items which should not be. However, only those of the pulses generated by the cells 28 which correspond to items of information that should be read are actually forwarded to the knitting stations: only when a synchronization pulse, delivered by one of the cells corresponding to projections *m* and *n* for reading the items of information 31 and 32 along tracks M and N, coincides with a pulse delivered by one of the other cells will this latter pulse in fact be transmitted. The items of information 31 are recorded at all of the locations 33 of track M and the items of information 32 are recorded at all of the locations 33' of track N. Cell *m* only becomes operative when the film is travelling in the direction of arrow 36 and cell *n* only becomes operative when the film is travelling in the direction of arrow 36'. Cell *m* delivers signals which are meant to synchronize with the signals delivered by the other cells reading the items of information recorded at locations 33, i.e. the items of information which are to be read as the film moves in the direction of arrow 36. There will therefore only be a control signal, as the film moves in the direction of arrow 36, when the signal delivered by a cell other than *m* coincides with a signal delivered by cell *m*, i.e. when the former signal is actually the result of reading an item of information recorded at a location 33. An "AND" circuit, not shown, delivers a control signal when these two signals coincide.

When reversing the direction of movement of the film, cell *m* is rendered inoperative, through inhibiting it from reading track M, and cell *n* is made to become operative. Thus, there will only be a control signal when the signal delivered by a cell other than *n* coincides with a signal delivered by cell *n*, i.e. when the former signal is due to reading an item of information recorded at a location 33'.

The stepping motor 4 is synchronized with the driving mechanism of the knitting machine. It imparts to the film 1 an intermittent (jerky) motion such that the items of information which are to be read by a cell come successively to lie at the center of the cell's sensitive surface at the end of the first half of a motor step and such that it may be read "on the hop." The same applies as regards the synchronization data. Thus, at the end of each motor step, it is one of the items of information that need not be read which comes to be centered over a cell. The latter nonetheless reads this item of information but no control signal will be issued to the corresponding knitting station since no synchronization datum will be there to be read at the same time.

However, it would be possible to arrange for the items of information to be read when the film is stationary or almost so when its speed of movement is at a minimum, between steps of the motor 4. One advantage of this latter solution is that items of information can be reread when the knitting machine resumes operation after a stoppage.

When the operative portion of the film, i.e. the portion carrying the information, has finished travelling past the reading means, the stepping motor is reversed by suitable electronic means which come into operation whenever a special datum, provided at each end of the film, is read.

This causes the direction of movement of the film to be reversed and at the same time cuts out (by suitable means) the reading action of the synchronization cell which, in the reversed direction of movement of the film, must remain inoperative, the other synchronization call being made operative again. The motor, after changing its direction of rotation, starts off by moving forward by one half-step so as to shift the film longitudinally in relation to the reading means by a corresponding distance whereby the items of information which are to be read in the new direction of movement of the film may come to move correctly past the reading means.

The same reversing procedure occurs at the end of each run of the film. The operation of the knitting machine can thus be controlled by a program, which, although it is repetitive, does not require any looped recording medium and which therefore does not give rise to the aforementioned storage problems posed by such looped media.

Figure 8:
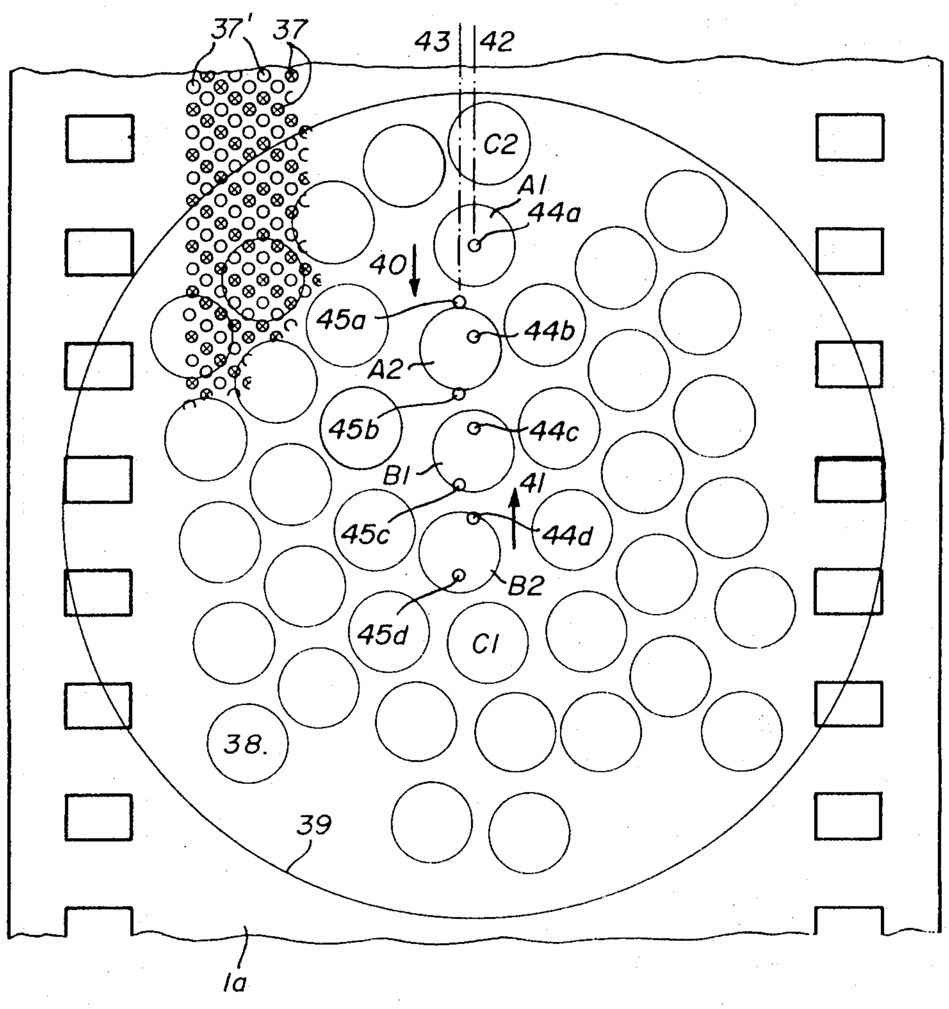

FIG. 8 shows a portion of a film 1*a* on which is to be recorded the information needed to program a knitting machine having 36 knitting stations.

The information is recorded on the film along tracks extending lengthwise of the film with each track including, in alternate order, items of information from two separate series, the items belonging to one series being read by the reading means when the film travels in one direction and the items belonging to the other series being read by the reading means when the film travels in the opposite direction.

Circles 37, marked with a cross, indicate the locations at which can be recorded items of information having to be read when the film travels past the reading means in the direction given by arrow 40, whereas the unmarked circles 37' indicate locations at which can be recorded items of information intended to be read when the film travels past the reading means in the opposite direction, i.e. the direction given by arrow 41. When the required items of information are recorded on film 1*a*, e.g. in the form of transparent circles or circular punched holes, they form 36 parallel tracks extending lengthwise of the film, i.e. one track per knitting station.

The nominal distance between two adjacent locations 37 and 37' along any one track is equal to the distance travelled by the film during one-half step of motor 4.

Film 1*a* carries 39 tracks of which only a few are represented in this Figure.

Of these 39 tracks, 36 are made up of locations 37 and 37' for receiving the information needed to control the operation of the 36 knitting stations of the machine; two, i.e. 42 and 43, contain the synchronization data and one, not shown, provides at each end at least one datum which, when read, causes the direction of rotation of motor 4 and hence of movement of film 1*a* to be reversed.

Circles 38 are projections on film 1*a* of the sensitive surfaces of 42 photoelectric cells for reading the 39 tracks of information on the film.

The synchronization data carried by track 42 are read both by cells A1 and B1 and the synchronization data carried by track 43 are read by both cells A2 and B2.

The data triggering off the reversal of the direction of rotation of the motor are read by cells C1 and C2.

Only the readings made by cells A1 and A2 are taken into consideration when the film moves in the direction of arrow 40 and only those made by cells B1 and B2 are taken into account when the film moves in the other direction (arrow 41).

The 39 cells are arranged so that they each may receive, through the items of information they are required to read, light from source 9 at the center of their sensitive surface. The diameter of each zone illuminated by source 9 on the film is slightly less than that of a location 37 or 37' for receiving an item of information and is such that any one zone could not possibly overlap, even partly, several items of information.

Cells A1 and A2, on the one hand, and cells B1 and B2, on the other hand, serve to inhibit any untimely reading of items of information that have already been read (or are yet to be read) along one track, which could be caused by longitudinal quivering of the film on account of the oscillations to which the rotor of the motor is subjected as a result of the constant stopping and starting action of the latter, should the amplitude of these oscillations reach or exceed one half-step of the motor.

Cells A1 and cells B1 and B2 are offset in relation to one another, longitudinally of the film, by a distance equal to a displacement of the latter corresponding to ($4n+1$) quarters of a motor step. In the example shown in FIG. 8, *n* is equal to 2, in view of the diameter and the arrangement of cells 38.

Items of information 44*a*, 44*b*, etc. along track 42 and items of information 45*a*, 45*b*, etc. along track 43 have a spacing along these tracks which is equal to the distance travelled by the film in the course of *n* steps of the motor, *n* having the same value as above. The items of information along track 42 are longitudinally offset in relation to those along track 43 by a distance such that when one item of information, e.g. 44*a*, along one track, i.e. 42, comes to lie opposite the center of its reading cell, i.e. A1, the middle of the zone lying between two successive items of information, e.g. 45*a* and 45*b*, along the other track, i.e. 43, comes to be positioned opposite the center of the cell, i.e. A2, associated with this above reading cell along this other track.

Figure 9:
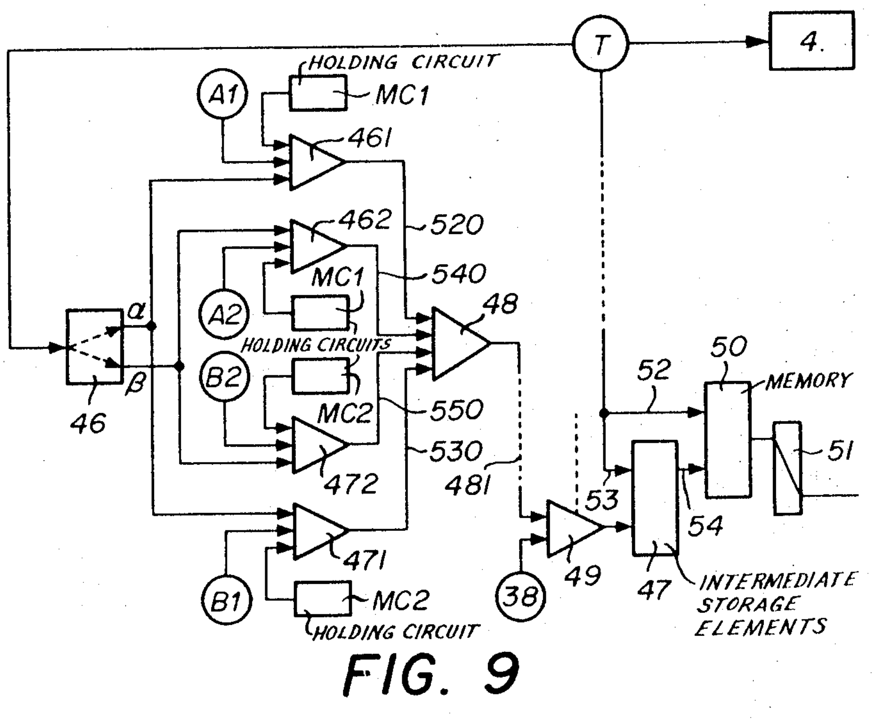
FIG. 9 shows a logic circuit used in connection with the second of these two ways of arranging information on a recording medium.

FIG. 9 illustrates the logic circuit used for reading film 1*a*. This circuit comprises a flip-flop circuit 46, four "AND" circuits 461, 471, 462 and 472, an "OR" circuit 48, 36 "AND" circuits 49, 36 intermediate storage elements 47 each associated with a working memory 50 of a relay 51 controlling the operation of one of the 36 knitting stations.

The flip-flop circuit 46 has two outputs $\alpha$ and $\beta$. The four "AND" circuits 461, 471, 462 and 472 have three inputs each. The first is connected to one of the outputs $\alpha$ and $\beta$ (output $\alpha$ in the case of circuits 461 and 471 and output $\beta$ in the case of circuits 462 and 472), the second is connected to one of the synchronization cells, A1, B1, A2 and B2 respectively, and the third is connected to the output of one of the holding circuits (MC1 in the case of circuits 461 and 462, and MC2 in the case of circuits 471 and 472) associated with each one of cells C1 and C2 that control the reversal of the direction of movement of the film.

The outputs 520, 530, 540 and 550 of the four "AND" circuits 461, 471, 462 and 472 are connected to the input of the "OR" circuit 48 whose output 481 is connected to one of the two inputs of each "AND" circuit 49, the other input of which being connected to the output of one of the 36 reading cells 38.

The output of each "AND" circuit 49 is connected to one of two inputs of a respective one of the 36 intermediate storage elements 47, their other input receiving from the machine pulses generated by a member T thereof. These pulses, termed interrogation pulses, are fed simultaneously to the inputs 52 of the working memories 50 of relays 51 thereby to interrogate these memories, to the inputs 53 of the intermediate storage elements 47, as already stated, thereby to set these elements back to zero, to the input of the flip-flop circuit 46 and to the drive means whose intermittent motion they cause. They thus ensure perfect synchronization of the operation of these different components.

Figure 10:
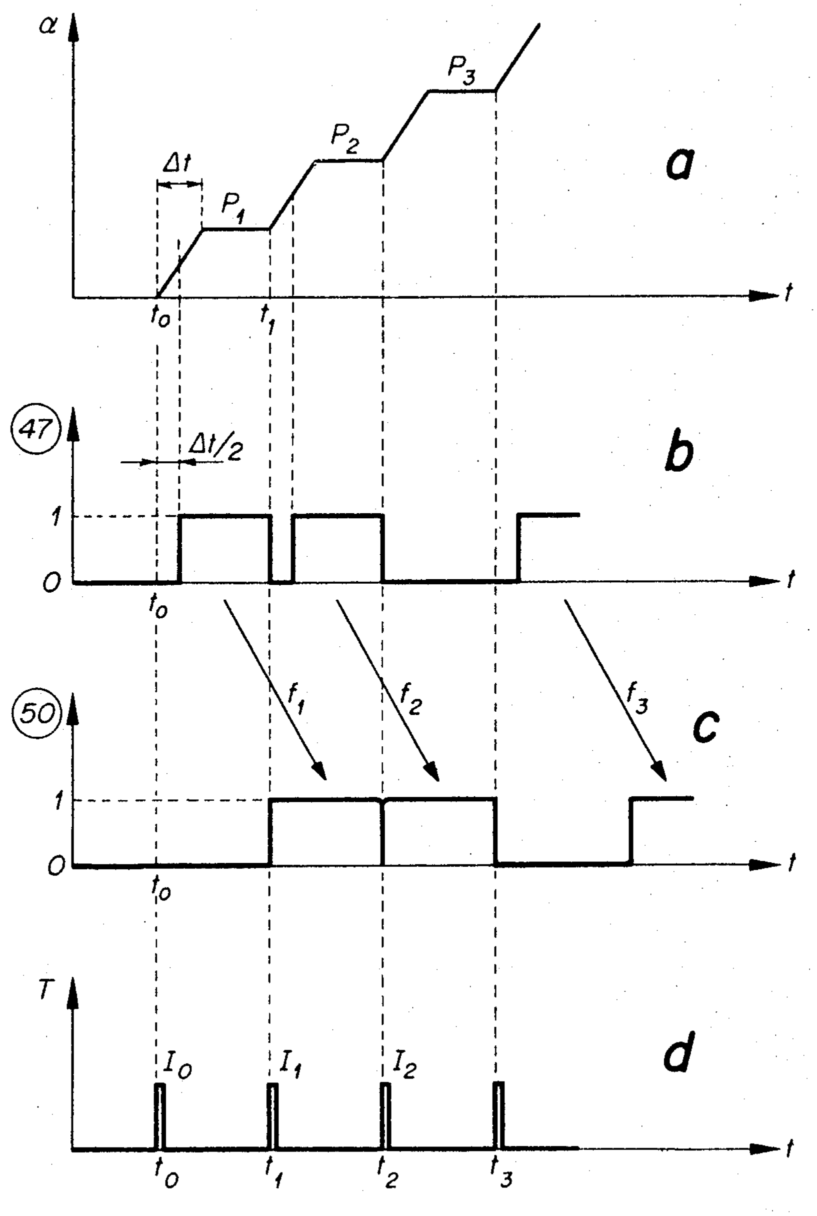
FIG. 10 is a diagram of the interrogation pulses sent out by a machine with which is associated a device according to the invention and the successive states of storage elements used in the FIG. 9 circuit.

FIG. 10 is a diagrammatic representation of these impulses and shows the successive states of the storage elements 47 and 50 in relation to time.

At each information reading sequence, flip-flop circuit 46 receives from the machine a pulse which alternately changes it over to $\alpha$ and to $\beta$. The inputs of circuits 461 and 471 and of circuits 462 and 472 are therefore alternately energized.

When the film comes to the end of its run in one direction movement, say that shown by arrow 41, cell C1, through reading an end-of-track-indicating datum, causes the direction of movement of the film to be reversed and at the same time causes a voltage to be applied to the inputs of circuits 461 and 462 only for as long as the film is moving in the direction of arrow 40, this voltage supply to these inputs being cut off when the direction of movement of the film is again reversed (i.e. that indicated by arrow 41). During this latter reversal, cell C2 causes a voltage to be applied to the inputs of circuits 471 and 472 only for as long as the film is moving in the direction of arrow 41.

Synchronization pulses are fed to the inputs of circuits 461 and 462 by cells A1 and A2 when the film is moving in the direction of arrow 40, and to the inputs of circuits 471 and 472 by cells B1 and B2 when the film is moving in the direction of arrow 41.

It is impossible for a pulse to issue simultaneously from more than one of the outputs 520, 530, 540 and 550 so that the "OR" circuit 48 can only receive one pulse at a time and will deliver at its output 481 an overall synchronization pulse each time the items of information that are emitted by the cells 38 have to be read and only when they are correctly positioned in front of these cells with a view to being read.

The synchronization datum **44*a* is read "on the hop" by cell A1 while a rotational step of the motor is in progress. This datum could however just as well be read between steps, thus making it possible for items of information to be read over again when the machine resumes operation after a stoppage. In both cases, there occurs in the film longitudinal quivering generated by the oscillation of the motor each time the latter proceeds from one step to the next. The spacing between two successive synchronization data and the arrangement of the logic circuit shown in FIG. 9 are such that any parasitic pulses emitted by the cells 38, through inadvertent reading, during such quivering, of the following or preceding items of information will be prevented from causing a wrong control to be emitted by the corresponding "AND" circuit 49**.

As each item of information is read, this "AND" circuit 49 conveys this item to the intermediate storage element 47 which feeds it to the input 54 of the working memory 50, the latter transmitting it to relay 51 only when it simultaneously receives (via input 52) from member T an interrogation pulse triggered off by the machine.

Each intermediate storage element 47 and its associated working memory 50 together constitute a kind of shift register.

Each interrogation pulse triggered off by the machine via member T in fact causes an item of information to be transferred from element 47, where it was stored during the previous reading, to the working memory 50 which uses it to hold the relay 51 or more generally the electromechanical member controlling a knitting station of the knitting machine.

This transfer will be explained with reference to FIG. 10 wherein:

part *a* shows the successive angular positions of the rotary component of motor 4, part *b* represents the successive states (0 or 1) of the intermediate storage element 47, part *c* shows the successive states (0 or 1) of the working memory 50 associated with relay 51, and part *d* represents the pulses sent out by the machine (member T).

In the selected example, the information is read "on the hop" while a step in the rotation of motor 4 is in progress.

At the origin of the time coordinate, it is supposed that the intermediate storage element 47 and the working memory 50 are in the 0 state, meaning that no information is stored there.

At instant $t_0$ a pulse $I_0$ is triggered off by the machine via member T and causes the motor 4 to move forward by one step to reach point $P_1$ in its rotational path at the end of a period of time $\delta t$. This pulse simultaneously changes over the flip-flop circuit 46, for instance into position $\alpha$, thereby energizing the corresponding input of the "AND" circuits 461 and 471 as from instant $t_0$.

The reading of the information takes place at instant $t_0+\delta t/2$. Since the holding circuit MC1 of cell C1, for instance, is operative, cell A1 issues a pulse, so that circuit 461 delivers at that instant a synchronization pulse which is fed to the input of the "AND" circuit 49, via the "OR" circuit 48 (lead 520).

This circuit 49, which simultaneously receives a pulse from cell 38 (it is assumed that this cell has read an item of information), causes the intermediate storage element 47 to pass at this instant $t_0+\delta t/2$ to the 1 state while the working memory is still in the 0 state.

At instant $t_1$ a new pulse $I_1$ is triggered off by the machine and causes the motor to move forward another step, which then reaches at instant $t_1+\delta t$ point $P_2$. This pulse, which is fed into the memory 50 via input 52, enables the 1 state of the intermediate storage element 47 to be transferred (symbolically as indicated by arrow $f_1$) through input 54 to the memory 50 which remains in this state at least until a new pulse is triggered off by the machine.

Still at instant $t_1$, pulse $I_1$ causes, via input 53, the element 47 to return to the 0 state. Element 47 is thus ready to be restored to the 1 state at instant $t_1+\delta t/2$ for which a new time of information is read by cell 38.

By way of example, it will be assumed in FIG. 10 that, if $t_2$ is the instant at which the next pulse $I_2$ is emitted, no item of information comes to pass before cell 38 at the reading instant $t_2+\delta t/2$ but that, at the next step of motor 4, a new item of information will be read by this cell.

If $t_3$ is the instant at which a fourth pulse is emitted by the machine, relay 51 is held by the memory throughout the period $t_1$ to $t_3$.

The unit formed by each element 47 and its associated working memory thus truly forms a kind of shift register since the item of information is read and stored in the intermediate storage element 47 with a lead of one step minus $\delta t/2$ in relation to its transfer to the memory 50 for holding relay 51.

Although in the foregoing description, the items of information are materialized by transparent circles or by punched holes, they could just as well be materialized by dark circles on a transparent background provided by the film.

The arrangement of the items of information on the film can of course differ from that described by way of example.

Instead of their items of information being alternated along each track, the two series or categories, of which the first is meant to be read in one direction of movement of the film and the second in the opposite direction, can for instance each be accommodated along its own set of tracks, whereby each track includes only items of information belonging to one or other category. This of course would involve increasing the number of tracks and a corresponding rearrangement of the reading means.

The film used in the above-described arrangement could be replaced by magnetic tape in which case the photoelectric cells would be replaced by magnetic reading heads and the information would be recorded by means of magnetic polarizations of the tape.

One particular advantage of a device according to the invention is that the film can be driven faultlessly at speeds of up to several 100 steps per second. Because of these high speeds, the device can provide, continuously, a large output of read information, thus making it particularly suitable for the repetitive programming of knitting machines.

We claim:

1. A device for repetitively playing back a plurality of series of information bits recorded along a plurality of longitudinal tracks on a tape, as for the programmed control of a plurality of components of a machine with continuous, cyclic operation, said device comprising: means for reading said information bits; means for winding and storing said tape; and reversible tape-driving means, wherein said reversible tape-driving means include means for engaging the tape, adjacent to said reading means, and actuating means therefore, adapted for reversible step-by-step movement of said tape past said reading means to enable reading one information bit recorded on each track at each step; said reading means include a main reading element for each of said tracks and a pair of reading elements respectively adapted to read one of two reversing information bits located at opposite ends of said tracks and to deliver corresponding direction-reversing signals to said tape-driving means to enable alternate step-by-step motion of said tape past said reading means, in both directions, from one end of said tracks to the other; and said device further comprising means for controlling the playback of the information bits read out by said main reading element of each track, said means for controlling being arranged to enable selective playback of a first half of each said series of information bits when said tape moves in one direction past said reading means, and of the second half of each said series when said tape moves in the opposite direction, the arrangement enabling repetitive playback of the information items of said series by back-and-forth movement of said tape past said reading means.

2. A device as claimed in claim 1 wherein said tape-driving means are arranged to displace said tape by half a step of said step-by-step movement each time said movement is reversed to allow reading of information bits of said first half-series recorded on the tape at a first set of spaced apart locations and of the said second half-series recorded on the tape at a second set of spaced apart locations, said first and second locations being longitudinally offset by a distance of said half a step.

3. A device as claimed in claim 1 wherein said main reading elements are adapted to read the information bits between successive stops of said step-by-step movement of the tape.

4. A device as claimed in claim 1 wherein said reading means include at least a second pair of reading elements associated with said means for controlling playback and adapted to respectively read a series of synchronization marks recorded along a pair of corresponding longitudinal tracks to allow synchronization marks recorded on one track of said pair to be read by the corresponding reading element when the tape travels in said one direction and the synchronization marks recorded on the other track of said pair to be read when the film is travelling in said opposite direction.

5. A device as claimed in claim 4, wherein said means for controlling playback include a plurality of "AND" circuits each having a first input for receiving pulses from one of said main reading elements and a second input for receiving pulses from one reading element of said second pair of reading elements, and each adapted to deliver a control pulse upon receiving coinciding pulses at said two inputs.

6. A device as claimed in claim 1 wherein a first set of said main reading elements is adapted to read bits of information belonging to said first half-series, said bit being recorded on a first set of tracks, and a second set of said main reading elements is adapted to read bits of information belonging to said second half-series, said bits being recorded on a second set of tracks, whereby each of said tracks may include only bits of information belonging to one of said half-series.

7. A device as claimed in claim 1 wherein the reading means include, for each track, a photoelectric cell adapted to read the items of information "on the hop" between consecutive stops of the film.

8. A device as claimed in claim 5 wherein the output of each "AND" circuit is connected to one of two inputs of an intermediate storage element able to assume a 0 state and a 1 state, the other input of said element being adapted to receive pulses emitted by a pulse-generating member of said machine, and wherein the output of said element is connected to one of two inputs of a working memory also able to assume a 0 state and a 1 state, the other input of said memory being adapted to receive the pulses emitted by said member, the arrangement being such that at each of said latter pulses, the 0 or 1 state of said intermediate storage element may be transferred to said working memory, said working memory being adapted to control an electromechanical component of said machine.